US007661592B1

(12) United States Patent
Chisholm et al.

(10) Patent No.: US 7,661,592 B1
(45) Date of Patent: Feb. 16, 2010

(54) INTERACTIVE SYSTEM INCLUDING INTERACTIVE APPARATUS AND GAME

(75) Inventors: Alex Chisholm, San Francisco, CA (US); Eric Petitt, San Francisco, CA (US); Chris Schmidt, Fairfax, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 383 days.

(21) Appl. No.: 11/148,791

(22) Filed: Jun. 8, 2005
(Under 37 CFR 1.47)

(51) Int. Cl.
*G06K 7/10* (2006.01)
*G06K 7/14* (2006.01)

(52) U.S. Cl. .................................. 235/454; 235/472.01

(58) Field of Classification Search ................................ 235/462.01–462.45, 472.01, 472.02, 472.03
See application file for complete search history.

(56) References Cited

U.S. PATENT DOCUMENTS

| | | | | |
|---|---|---|---|---|
| 6,502,756 | B1 | 1/2003 | Fahraeus | |
| 6,959,866 | B2 * | 11/2005 | Takahashi et al. | 235/454 |
| 6,966,495 | B2 | 11/2005 | Lynggaard et al. | |
| 2003/0014615 | A1 | 1/2003 | Lynggaard | 712/220 |
| 2005/0057534 | A1 * | 3/2005 | Charlier | 345/179 |
| 2006/0028457 | A1 * | 2/2006 | Burns | 345/179 |
| 2006/0030410 | A1 * | 2/2006 | Stenton et al. | 463/43 |
| 2007/0268278 | A1 * | 11/2007 | Paratore et al. | 345/179 |

FOREIGN PATENT DOCUMENTS

| | | |
|---|---|---|
| WO | 0073983 | 12/2000 |
| WO | 0101670 | 1/2001 |
| WO | 0116691 | 3/2001 |
| WO | 0126032 | 4/2001 |
| WO | 0171473 | 9/2001 |
| WO | 0171475 | 9/2001 |
| WO | 0175723 | 10/2001 |
| WO | 0175773 | 10/2001 |
| WO | 0175780 | 10/2001 |
| WO | 0195559 | 12/2001 |

* cited by examiner

*Primary Examiner*—Thien M Le

(57) ABSTRACT

An interactive apparatus that is used in a game. The interactive apparatus is in the form of a stylus and contain a stylus housing and a processor coupled to the stylus housing and a memory unit comprising computer code for playing a game involving a plurality of printed cards and an audio output device and an optical emitter and an optical detector and wherein the audio output device, the memory unit, the optical emitter, and the optical detector are operatively coupled to the processor. The apparatus may scan the cards to enhance an interactive game play.

23 Claims, 4 Drawing Sheets

INTERACTIVE SYSTEM INCLUDING INTERACTIVE APPARATUS AND GAME

BACKGROUND TO THE INVENTION

Children, young adults and adults enjoy playing games that involve cards. Cards can convey information and can engage game players by enhancing role playing and other educational aspects of game play.

Computer systems also enhance and extend the enjoyment of game play and other forms of educational entertainment. Computer systems can be interactive and generate audio and other feedback for enhanced game play. Card games that are played in conjunction with computer systems can provide unique entertainment and educational benefits.

SUMMARY OF THE INVENTION

One embodiment of the invention is directed to an interactive apparatus in the form of a stylus, the interactive apparatus comprising: a stylus housing; a processor coupled to the stylus housing; a memory unit comprising computer code for playing a game with a plurality of printed cards; an audio output device; an optical emitter; and an optical detector, wherein the audio output device, the memory unit, the optical emitter, and the optical detector are operatively coupled to the processor.

Another embodiment of the invention is directed to a method comprising: obtaining a plurality of cards including substantially invisible codes and images overlapping the substantially invisible codes; and playing a game with the cards using an interactive scanning apparatus, wherein the interactive scanning apparatus scans the substantially invisible codes and interacts therewith.

These and other embodiments of the invention will be described in further detail below.

DETAILED DESCRIPTION

Figure 1:
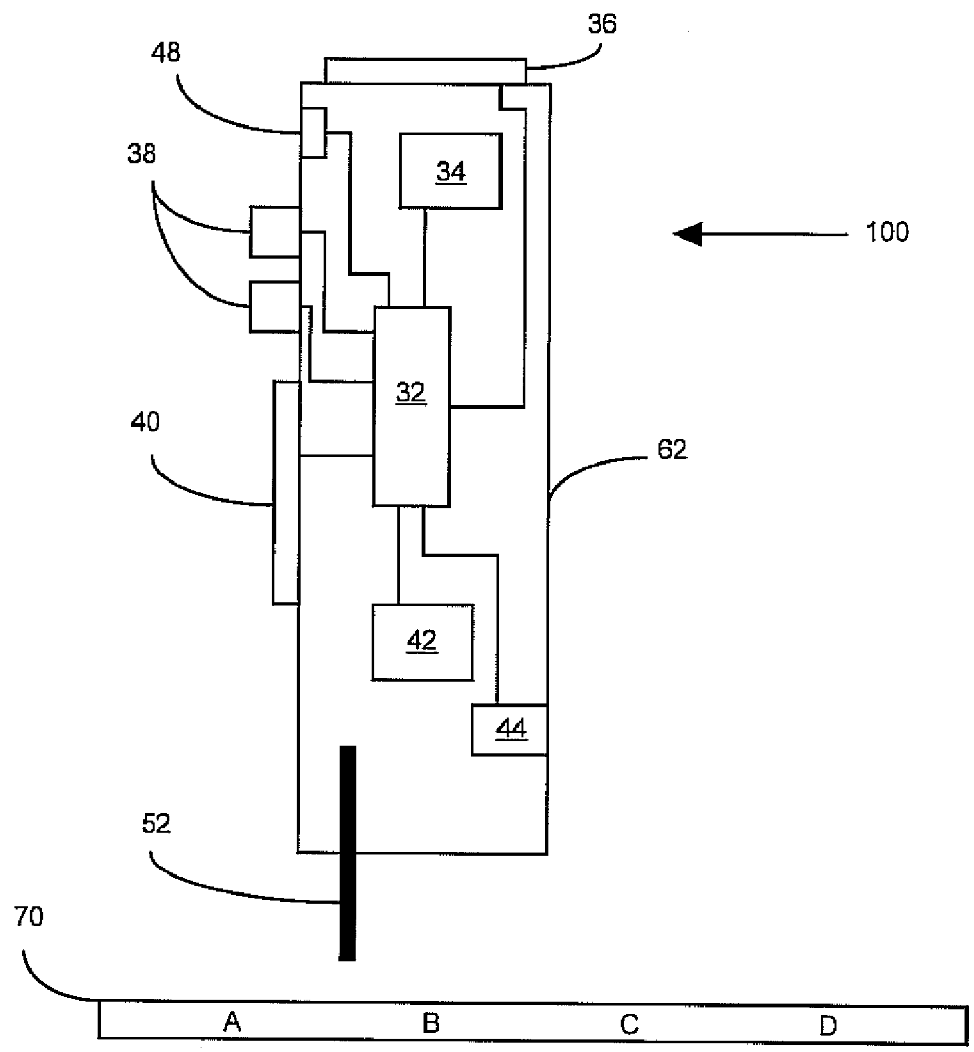
FIG. 1 shows a schematic drawing of an interactive system in accordance with one embodiment of the present invention including a two-dimensional article and an interactive apparatus.

Embodiments of the invention include interactive apparatuses, systems, and methods. They may be used to teach or learn about any suitable subject. For example, the interactive apparatuses can be preprogrammed to teach about subjects such as letters, numbers, math (e.g., addition, subtraction, multiplication, division, algebra, etc.), social studies, phonics, languages, history, etc.

In some embodiments, the interactive apparatus may scan substantially invisible codes on a sheet of paper. Interactive apparatuses of this type are described in U.S. Patent Application Nos. 60/456,053, filed Mar. 18, 2003, and 10/803,803 filed on Mar. 17, 2004, which are herein incorporated by reference in their entirety for all purposes. The interactive apparatus may include an optical emitter and an optical detector operatively coupled to the processor. The interactive apparatus can optically scan substantially invisible codes on an article having a surface having a plurality of positions. Different codes are respectively at the plurality of positions and may relate to the locations (e.g., the relative or absolute spatial coordinates) of the plurality of positions on the surface.

A "graphic element" may include any suitable marking created by the user. If a marking is made on a sheet of paper, the graphic element may be a print element. Suitable graphic elements include, but are not limited to symbols, indicia such as letters and/or numbers, characters, words, shapes, lines, etc.

The processor can recognize the graphic elements and can identify the locations of those graphic elements so that the interactive apparatus can perform various operations. In these embodiments, the memory unit may comprise computer code for correlating any graphic elements produced by the user with their locations on the surface.

In some embodiments, the article can be a sheet of paper or a card with or without pre-printed print elements. The sheet can have substantially invisible codes on them. The codes are "substantially invisible" to the eye of the user and may correspond to the absolute or relative locations of the print elements on the page. "Substantially invisible" also includes codes that are completely or slightly invisible to the user's eye. For example, if dot codes that are slightly invisible to the eye of a user are printed all over a sheet of paper, the sheet may appear to have a light gray shade when viewed at a normal viewing distance. In some cases, after the user scans the codes with the interactive apparatus, an audio output device in the interactive apparatus produces unique audio outputs (as opposed to indiscriminate audio outputs like beeping sounds) corresponding to graphic elements that are associated with the codes.

Preferably, the substantially invisible codes are embodied by dot patterns. Technologies that read visible or "subliminally" printed dot patterns exist and are commercially available. These printed dot patterns are substantially invisible to the eye of the user so that the codes that are present in the dot patterns are undetectable by the user's eyes in normal use (unlike normal bar codes). The dot patterns can be embodied by, for example, specific combinations of small and large dots that can represent ones and zeros as in a binary coding. The dot patterns can be printed with ink that is different than the ink that is used to print the print elements, so that the interactive apparatus can specifically read the dot patterns.

Anoto, a Swedish company, employs a technology that uses an algorithm to generate a pattern the enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

In some embodiments, the dot patterns may be free of other types of data such as data representing markers for data blocks, audio data, and/or error detection data. As noted above, the processor in the interactive apparatus can determine the location of the stylus using a lookup table, and audio can be retrieved and played based on the location information. This has advantages. For example, compared to paper that has data for markers, audio, and error detection printed on it, embodiments of the invention need fewer dots, since data for markers, audio, and error detection need not be printed on the paper. By omitting, for example, audio data from a piece of paper, more space on the paper can be rendered interactive, since actual audio data need not occupy space on the paper. In addition, since computer code for audio is stored in the interactive apparatus in embodiments of the invention, it is less likely that the audio that is produced will be corrupted or altered by, for example, a crinkle or tear in the sheet of paper.

Although dot patterned codes are specifically described herein, other types of substantially invisible codes may be used in other embodiments of the invention. For example, infrared bar codes could be used.

As noted, in preferred embodiments, the substantially invisible codes may directly or indirectly relate to the locations of the plurality of positions and/or any print elements on the sheet. In some embodiments, the substantially invisible codes can directly relate to the locations of the plurality of positions on a sheet (or other article). In these embodiments, the locations of the different positions on the sheet may be provided by the codes themselves. For example, a first code at a first position may include code for the spatial coordinates (e.g., a particular x-y position) for the first position on the sheet, while a second code at a second position may code for the spatial coordinates of the second position on the sheet. Different graphic elements such as different print elements can be at the different positions on the sheet. These print elements may be over or under the codes. For example, a first print element can be at the first position overlapping the first code. A second print element can be at the second position overlapping the second code. When a user selects the first print element, the interactive apparatus simultaneously scans the first code that is associated with the first print element. A processor in the interactive apparatus can determine the particular spatial coordinates of the first position and can correlate the first print element with the spatial coordinates. When the user selects the second print element, the interactive apparatus substantially simultaneously scans the second code. A processor can then determine the spatial coordinates of the second position and can correlate the second print element with the spatial coordinates. The processor can then retrieve appropriate audio corresponding to the selected first and second print elements.

The interactive apparatus may also include a mechanism that maps or correlates relative or absolute locations with the graphic elements in the memory unit. The mechanism can be a lookup table that correlates data related to specific graphic elements on the article to particular locations on an article. This lookup table can be stored in the memory unit. The processor can use the lookup table to identify graphic elements at specific locations so that the processor can perform subsequent operations.

The article with the substantially invisible codes can be in any suitable form. For example, the article may be a single sheet of paper, a note pad, filler paper, a poster, a placard, a menu, a sticker, a tab, product packaging, a box, a trading card, a magnet (e.g., refrigerator magnets), etc. Any of these or other types of articles can be used with or without pre-printed print elements. If the article is a sheet, the sheet can be of any suitable size and can be made of any suitable material. For example, the sheet may be paper based, or may be a plastic film. The article is preferably a card.

In some embodiments, the article may be a three-dimensional article with a three-dimensional surface. The three-dimensional surface may include a molded figure of a human body, animals (e.g., dinosaurs), vehicles, characters, or other figures.

As noted above, in some embodiments, the article is a sheet and the sheet may be free of pre-printed print elements such as printed letters or numbers (e.g., markings made before the user creates graphic elements on the sheet). In other embodiments, pre-printed print elements can be on the sheet (e.g., before the user creates graphic elements on the sheet). Pre-printed print elements can include numbers, icons, letters, circles, words, symbols, lines, etc.

The interactive apparatus can be in any suitable form. In one embodiment, the interactive apparatus is a scanning apparatus that is shaped as a stylus, and is preferably pocket-sized. The stylus includes a stylus housing that can be made from plastic or metal. A gripping region may be present on the stylus housing. If the interactive apparatus is in the form of a portable, self-contained stylus, the interactive apparatus can weigh about 4 ounces, can have a battery life of about 40 hours, and can use a processor (e.g., including an ASIC chip) to control the functions of the interactive apparatus. The stylus may contain an earphone jack, a data port, flash memory, batteries, and an optical scanner (with an optical detector and an optical emitter) at the stylus tip, and a speaker. The stylus can resemble a pen at its lower half, and can flow broader at the top to rest comfortably between the user's thumb and forefinger.

FIG. 1 shows a system according to an embodiment of the invention. The system includes an interactive apparatus 100 and an article 70. The interactive apparatus 100 is in the form of a stylus.

The interactive apparatus 100 includes a processor 32 inside of a stylus housing 62. The stylus housing 62 may be coupled, directly or through intervening physical structures, to the processor 32. The interactive apparatus 100 also includes an audio output device 36 and a display device 40 coupled to the processor 32. The audio output device 36 can include a speaker or an audio jack (an earphone or headphone jack). The display device 40 can include an LCD (liquid crystal display), or any other suitable display device. A device for providing tactile feedback (not shown) may also be present in the stylus housing 62. In some embodiments, the display device 40 can be physically coupled to the stylus housing 62.

Input buttons 38 are also present and are electrically coupled to the processor 32 to allow a user to input information (such as start, stop, or enter) into the apparatus 100 and/or turn the apparatus 100 on and off. A power source 34 such as a battery is in the housing 62 and supplies electricity to the processor 32 and other components of the interactive apparatus 100.

An optical emitter 44 and an optical detector 42 are at one end of the stylus-shaped interactive apparatus 100. The optical emitter 44 and the optical detector 42 are coupled to the processor 32. The optical emitter 44 may be, for example, an LED (light emitting diode) or other light source, while the optical detector 42 may comprise, for example, a charge coupled device.

The processor 32 may include any suitable electronics to implement the functions of the interactive apparatus 32. For example, the processor 32 may include a microprocessor with speech synthesizing circuitry for producing synthesized speech, amplifier circuits for amplifying the speech, circuitry for controlling any inputs to the interactive apparatus 100 and any outputs provided by the interactive apparatus 100, as well as an analog-to-digital converter to convert signals received from the optical detector 42 into digital signals.

A memory unit 48 is also present in the interactive apparatus 100. The memory unit 48 is coupled to the processor 32. The memory unit 48 may be a removable memory unit such as a ROM or flash memory cartridge. In other embodiments, the memory unit 48 may comprise one or more memory units (e.g., RAM, ROM, EEPROM, etc.) that are completely internal to the housing 62. In other embodiments, the memory unit 48 may comprise the combination of two or more memory devices internal and/or external to the stylus housing 62.

The memory unit 48 may comprise any suitable magnetic, electronic, electromagnetic, optical or electro-optical data storage device. For example, one or more semiconductor-based devices can be in a memory unit 48.

The memory unit 48 comprises computer code for performing any of the functions of the interactive apparatus 100. For example, the memory unit 48 may comprise computer code for recognizing printed characters, computer code for recognizing a user's handwriting and interpreting the user's handwriting (e.g., handwriting character recognition software), computer code for correlating positions on an article with respective print elements, code for converting text to speech (e.g., a text to speech engine), computer code for reciting menu items, computer code for performing translations of language (English-to-foreign language dictionaries), etc. Software for converting text to speech is commercially available from a number of different vendors. The memory unit 48 may also comprise code for audio and visual outputs. For example, code for sound effects, code for saying words, code for lesson plans and instruction, code for playing games with cards, code for questions, etc. may all be stored in the memory unit 48. Code for audio outputs such as these may be stored in a non-volatile memory (in a permanent or semi-permanent manner so that the data is retained even if the interactive apparatus is turned off), rather than on the article itself. Computer code for these and other functions described in the application can be included in the memory unit 48, and can be created using any suitable programming language including C, C++, etc.

An optional writing element 52 is at the same end of the stylus-shaped interactive apparatus 100 as the optical emitter 44 and the optical detector 42. The writing element 52 may comprise a marker, crayon, pen or pencil and may or may not be retractable. If it is retractable, then the writing element 52 may be coupled to an actuator. A user may actuate the actuator to cause the writing element to extend outward from or retract into the stylus housing. When it is used, a user can hold the stylus-shaped interactive apparatus 100 and use it to write on a sheet. The user's markings may also be scanned using the optical emitter 44 and the optical detector 42 and the processor 32 may interpret the user's writing.

The article 70 illustrated in FIG. 1 is two-dimensional and may be, for example, a card. In FIG. 1, the letters A, B, C, and D represent different positions on the article 70. The different positions A, B, C, and D on the article 70 can have different codes (not shown) and different print elements (not shown). The codes and the print elements may overlap at positions A, B, C, and D. The different codes are substantially invisible to the eye of the user, and a user is unable to see the codes with the user's eyes in normal use.

Figure 2:
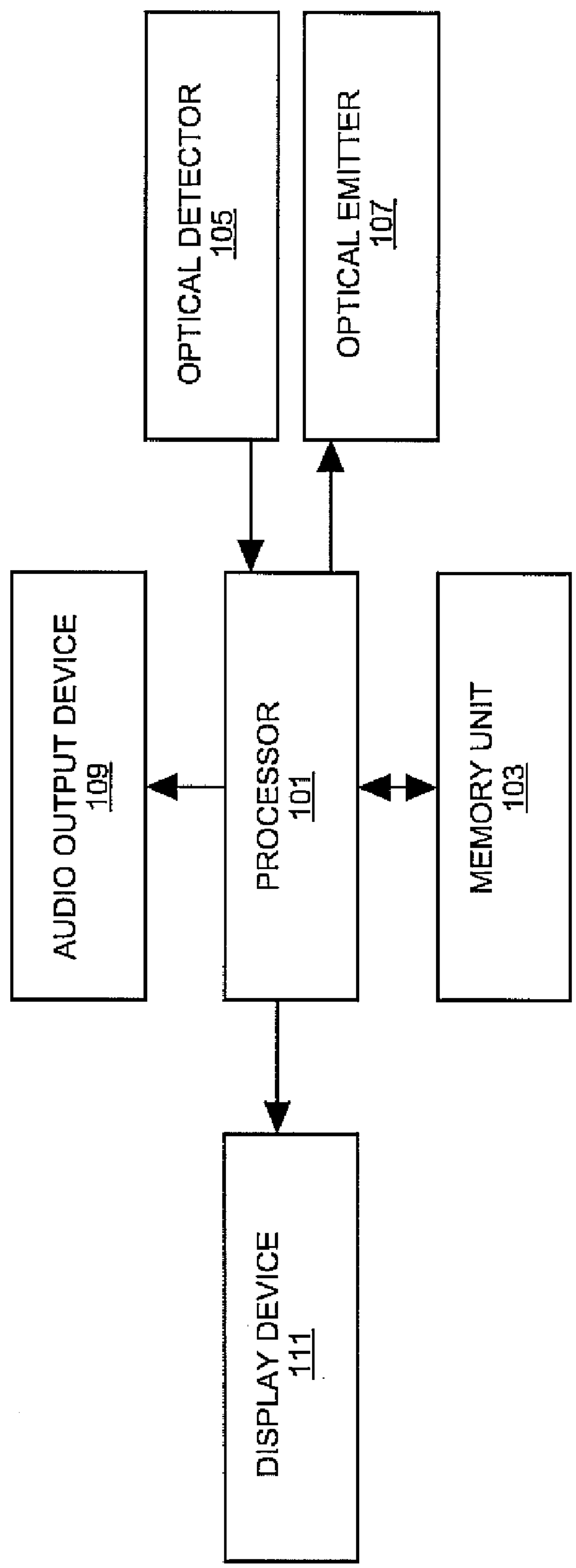
FIG. 2 shows a block diagram of some electronic components of an interactive apparatus according to an embodiment of the invention.
Figure 3:
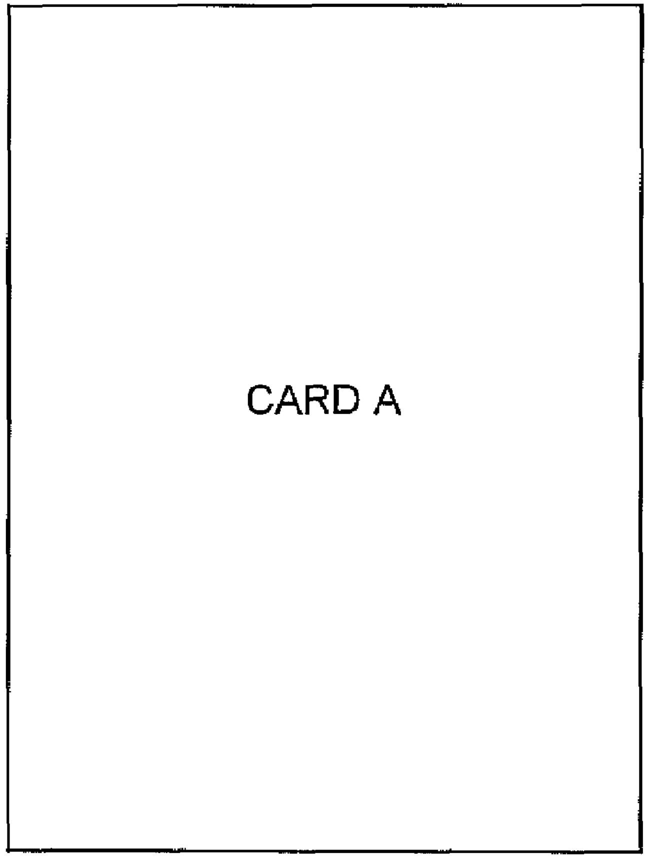
FIG. 3 shows a card with a print element and dot patterns in accordance with one embodiment of the present invention.

FIG. 2 shows a block diagram of some electrical components that can be used in a interactive apparatus according to an embodiment of the invention. The interactive apparatus may include a processor 101 and a memory unit 103 coupled to the processor 101. The processor 101 and the memory unit 103 may be embodied by one or more computer chips, alone, or in combination with one or more removable memory storage devices (e.g., memory sticks, memory cards, etc.). In some embodiments, the processor 101 may include an application specific circuit, and a speech synthesizer may be associated (e.g., within or coupled to the processor) with the processor 101. An optical detector 105 and an optical emitter are also operatively coupled to the processor 101. Output devices such as a display device 111 (e.g., an LCD or LED screen) and an audio output device 109 (e.g., a speaker or an earphone) may also be coupled to the processor 101. Additional exemplary details relating to these components are provided above and below.

Game Examples

Embodiments of the invention include a trading card and collectibles game with original characters, story elements, and a world into which licensed characters easily move, inviting children, primarily boys, 8-12 years old, to participate in an adventure, creating excitement, intrigue, and fun while motivating learning.

Game features (1) Backstory and game play emerges from and supports interactive apparatus positioning (i.e., the playspace is an "elseworld" that one unlocks with the interactive apparatus);

(2) Develop a compelling goal that kids will want to achieve through game play (i.e., seek out and destroy the Inventor's secret lair, where he is developing a more powerful tool that will ultimately collect and steal all human knowledge);

(3) Establish a scalable infrastructure that supports characters that can be "licensed into" game from popular culture;

(4) Create a partitioned backstory that allows one to introduce characters and story elements over time; and/or (5) Present very clear game play in which the interactive apparatus plays an integral role and supports contextual learning.

The Adventure

Several thousand years ago, the Inventor, a wicked sorcerer-scientist, conjured an army of talking pens to capture all original human creativity and knowledge without writers and artists knowing they were being "watched." The Inventor wanted to be the smartest man to ever live, stealing from the first people to ever write down their ideas. Each Ecko, as the talking pen was called, was ordered to report back to the Inventor whatever it had written down in the hands of others.

At first, the Eckos fulfilled their mission, telling the Inventor about the many new ideas they were used to capture for those early writers and artists; they would return to the Inventor's lair and tell its master everything they had created. Then, after hundreds of years, the Eckos started to disappear, fewer and fewer returned to the Inventor with their usual frequency. Those that did return, seemed to be resistant to the Inventor's demands, telling him tall tales of what they had supposedly been used to create and write. Concerned, the Inventor followed several of his seemingly most loyal soldiers, only to learn that they served another—the Liberator, a poet who had been teaching the pens to help others, had encouraged the Eckos to take control of their and their users' destiny. To protect themselves and hide their true mission, the Liberator and Eckos created a secret society, Fibber, to fool the Inventor and protect writers and artists from having their creations discovered by the wicked sorcerer-scientist.

Now incensed by how he had been deceived, the Inventor started to destroy the pens when they returned to him; he refused to let his army do anything other than serve him. To protect them, the Liberator began to hide the Eckos, locking away the secrets still contained by the legions of Fibber, ensuring the safety of the Eckos until after the Inventor had died.

Unfortunately, the Inventor knew that he would never overcome the Liberator in his own lifetime, so he put himself into a deep hibernation, planning to awaken only when a "significant number" of Eckos were found and released back into the world. He vowed to ultimately destroy the spirit of Fibber and regain control of the Eckos.

In 2005, Phineas and pals, stumble into one of the chambers where the Liberator hid one of the Eckos, the one he had worked with and with which he had started the Fibber movement. Phineas and his friends awaken it and begin the adventure of a lifetime.

To further the story and provide a contemporary context for the game, a set of five characters is developed who, by virtue of the backstory and game play, will interact at different times with elements of the Inventor's and Liberator's world, as well as with the sages, heroes, and villains featured in Fibber.

(1) Phineas—Spunky, disobedient nine year-old; a young genius from London;

(2) Denise—Outspoken but open-minded ten year old;

(3) Jade—Smart, inquisitive eight year-old girl from Beijing;

(4) Drew—Soft spoken, artistic 11 year-old;

(5) Ati—Shape-shifting animal; most powerful as a wolf.

The game may include:

(1) Included Kit a. Two-page graphic novel spread in "gateway book"

(2) Web a. A web site will include story elements and exposition with narrative text, artwork, and Flash animations;

b. The site may continue to support exploration of backstory, as well as community around the game (3) Graphic Novels a. There may graphic novels to expand the backstory and enhance gameplay;

b. A Circle of Sages workbook series could also be developed, exposing kids to the expertise of those "great minds in history" who had accidentally discovered an Ecko and, by learning the secrets of Fibber, became even more successful.

Gameplay

Figure 4:
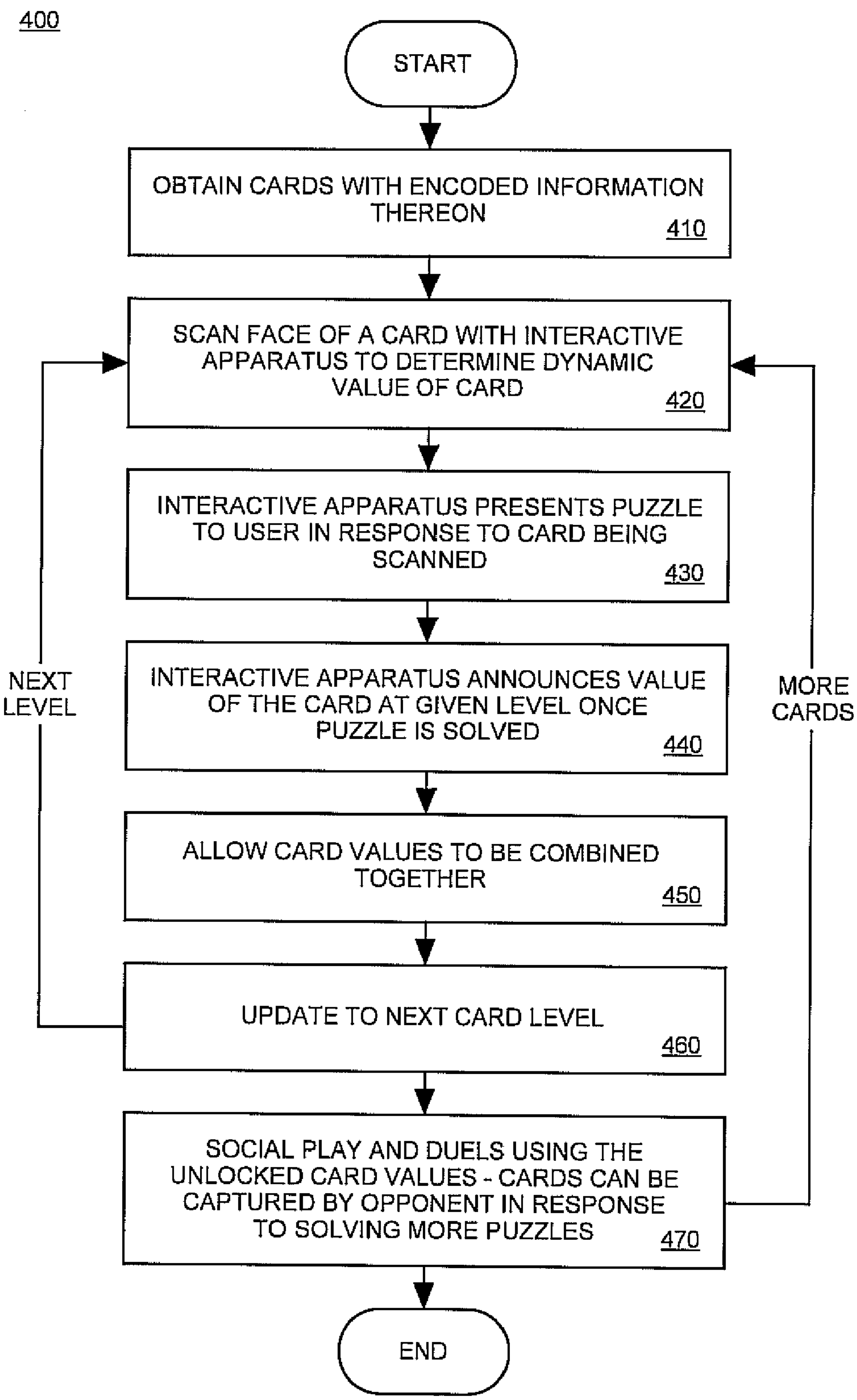
FIG. 4 is a flow diagram of an exemplary game play in accordance with an embodiment of the present invention.

FIG. 4 is a flow diagram 400 of exemplary gameplay steps in accordance with an embodiment of the present invention. The goal of the game requires players to navigate a fictional world of heroes, villains, and sages, gathering valuable information from each figure on a quest to locate the Inventor's lair, destroy his ivory staff (the source of his power), and awaken the full legion of Eckos. Emerging directly from the backstory and weaving in elements of popular culture, the game of "Fibber" is built on an expandable set of trading cards, tools, and accessories. The trading cards my include printed images and the substantially invisible codes (e.g., dot codes) as described above. Some elements include:

(1) Trading cards—Heroes, Villains, and Sages;

(2) Codes—Secret alphabet based on ancient runes and alphabets;

(3) Keystone—Code value tables and decoder scratch pad;

(4) Interactive Apparatus—Assumes the role of Ecko.

As with other popular trading card games, each card features spectacular art and allows the user to determine attack and defense values, 410. Fibber art can be a blend of Japanese Manga styles mixed with classic western portraiture and illustration.

The unique features of Fibber "attack" and "defense" values emerge through the role of the interactive apparatus during individual and social gameplay. Unlike other trading card games that rely on pre-printed values on the face of each card, Fibber cards are released with nothing but character art—a Hero, Villain, or Sage—on one side and a piece of "map" printed on the other.

Card values are unlocked using the interactive apparatus. Initially, a player touches the face of each card 420 with the interactive apparatus and is given a puzzle to solve, based on either a secret number series (i.e., Fibonacci Numbers) or an anagram (i.e., individual words that are part of the backstory or can be used in magic spells) 430. When the player unlocks the first level of each card, he is given a "value" 440 that is represented by three ancient alphabets and symbol sets—Greek, Nordic rune, and Celtic Treespeak. Cards that feature Sage characters may be used as "tutors" during individual play or as "shields" during social play and duels.

Each card will likely contain at least three or four levels 460 of individual play, allowing the user to "self power up" the value of his card deck right out of the box or after being unwrapped from his booster pack. Once the symbols are unlocked and the player understands the "power" of his deck, he is ready for social play and "duels". Also, the three symbol sets represent a unique element of gameplay, enabling the cards to be combined 450 and joined together to "power up" or create additional "shields" in the heat of subsequent social play and duels.

During social play and "duels," 470 players attempt to outwit their opponents by capturing each other's most powerful cards. During these sessions, each player has his own interactive apparatus; each interactive apparatus works as the players' second, offering additional layers of number and anagram puzzles for players to solve during efforts to capture an opponents' card. There may be wireless communication among different interactive apparatuses.

Finally, the collective body of information and knowledge collected during individual and social play, including both decoded numbers and words, is ultimately applied to play on the "gameboard," which is created with the pieces of map printed on the reverse side of all cards are lined up and ordered correctly. Game pieces are made up of the three symbol sets carved onto the flat faces of small colored stones.

Trading Cards. A set of fifty (50) cards may be bundled in the following clusters: Included Kit—Five (5) cards; Internet Upgrade Kit—Twenty (20) cards; Booster Pak I—Ten (10) cards; Booster Pak II—Ten (10) Cards; and five (5) cards Characters on Game Cards. The characters on the cards can be licensed characters or characters from the public domain: Examples include characters include sages (e.g., William Shakespeare, Issac Newton), heroes (e.g., Sinbad, Hercules), villains (e.g., Dracula/Nesferatu), etc.

Accessories. Accessories that further support and enhance game play include: carrying cases or "holsters"; maps; books and graphic novels with supplemental source materials; pen caps; enhanced keystones with the history of symbol and rune sets; posters featuring heroes, villains, and sages in the "elseworld" scenarios. Any of these accessories may include the substantially invisible codes (e.g., dot codes) and print elements as described above.

Various descriptions of hardware and software are provided herein. It is understood that the skilled artisan knows of many different combinations of hardware and software that can be used to achieve the functions of the interactive apparatus described herein.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

Moreover, any one or more features of any embodiment of the invention may be combined with any one or more other features of any other embodiment of the invention, without departing from the scope of the invention.

All references, patent applications, and patents mentioned above are herein incorporated by reference in their entirety for all purposes. None of them are admitted to be prior art to the presently claimed inventions.

What is claimed is:

1. An interactive apparatus in the form of a stylus, the interactive apparatus comprising:

a housing;

a processor disposed within the housing;

a memory unit comprising computer instructions for causing said processor to implement an interactive game involving a plurality of printed cards;

an output device; and an optical sensor, and wherein said sensor is operable to provide said processor with signals representative of codes disposed on said plurality of printed cards for identification thereof and wherein further said processor is operable to access information stored within said memory unit corresponding to an identified card.

2. An interactive apparatus as described in claim 1 wherein said information is a value associated with a level.

3. An interactive apparatus as described in claim 2 wherein said output device is operable to generate audible signals representing said value.

4. An interactive apparatus as described in claim 1 wherein said printed cards represent different categories of characters involved in said interactive game.

5. An interactive apparatus as described in claim 1 wherein said printed cards have images printed thereon.

6. An interactive apparatus as described in claim 1 further comprising a pen cap.

7. An interactive apparatus as described in claim 1 wherein said printed cards have images of a gameboard map printed thereon.

8. An interactive apparatus as described in claim 1 wherein said information is a puzzle.

9. An interactive apparatus as described in claim 1 wherein said processor, said memory unit, said output device and said sensor are coupled to said housing.

10. An interactive apparatus as described in claim 1 wherein said output device is a speaker.

11. An interactive apparatus comprising:

a housing;

an optical sensor operable to detect a code on a printed card, wherein said code is invisible and relates to a location of a print element on said printed card;

a processor disposed within said housing, wherein said processor is operable to process said code and responsive thereto provide an output response;

a memory unit operable to store computer instructions for causing said processor to implement an interactive game involving said printed card and responsive to said optical sensor being placed over print elements of said printed card; and an output device operable to provide said output response.

12. The interactive apparatus as described in claim 11, wherein said memory unit is further operable to store information that enables correlating said print element to said location of said print element.

13. The interactive apparatus as described in claim 11, wherein said output device comprises a display.

14. The interactive apparatus as described in claim 11, wherein said output device comprises a speaker.

15. The interactive apparatus as described in claim 11, wherein interactive game comprises a value associated with a level.

16. The interactive apparatus as described in claim 11, wherein said printed card comprises an image of a gameboard map.

17. The interactive apparatus as described in claim 11, wherein said interactive game comprises a puzzle information.

18. The interactive apparatus as described in claim 11, wherein said location of said print element is relative to a location of another print element.

19. The interactive apparatus as described in claim 11 further comprising:

an optical emitter operable to emit light.

20. The interactive apparatus as described in claim 11, wherein said optical sensor is a charge coupled device.

21. The interactive apparatus as described in claim 11, wherein said processor is further operable to provide a tactile feedback.

22. The interactive apparatus as described in claim 11 further comprising:

a wireless communication component.

23. The interactive apparatus as described in claim 11, wherein said print element is associated with said interactive game.

* * * * *